United States Patent

Morris

[15] 3,638,878
[45] Feb. 1, 1972

[54] FISHING LINE SPOOL HOLDER

[72] Inventor: Heber L. Morris, 3591 Roslyn Ave., Kettering, Ohio 45429

[22] Filed: Aug. 12, 1970

[21] Appl. No.: 63,160

[52] U.S. Cl. ............................................242/129.8, 242/139
[51] Int. Cl. .............................................................B65h 49/00
[58] Field of Search ................................242/129.5–129.8, 242/139, 141; 112/218 R; 248/206 R; 43/25.2

[56] References Cited

UNITED STATES PATENTS

| | | | |
|---|---|---|---|
| 2,239,226 | 4/1941 | Graham, Sr. | 242/141 |
| 2,688,294 | 9/1954 | McCloud | 112/218 R |
| 3,261,569 | 7/1966 | Bedell | 242/136 |
| 3,295,787 | 1/1967 | Golonka | 242/129.8 |
| 3,402,501 | 9/1968 | Davis | 43/25.2 |

Primary Examiner—Leonard D. Christian
Attorney—Dybvig & Dybvig

[57] ABSTRACT

For holding fishing line spools in position for convenient dereeling of the line, a spindle is supported by a suction cup. The spool is slidably mounted on the spindle between a pair of slidably mounted retaining plates held on the spindle by a spiral spring coiled about the spindle and a retaining clip passing through an aperture in the spindle. The spring is compressed to resist rotation of the spool. Plural apertures are provided in the spindle for accommodating different lengths of spools. The spindle is of substantially the same diameter as the bores of commercially available spools and the retaining plates have hubs projecting from one surface thereof to provide bearings for spools having larger diameter bores.

10 Claims, 4 Drawing Figures

PATENTED FEB 1 1972

3,638,878

INVENTOR.
HEBER L. MORRIS

BY Dybwig and Dybwig

HIS ATTORNEYS

FISHING LINE SPOOL HOLDER

BACKGROUND OF THE INVENTION

This invention relates to a holder for fishing line supply spools.

Fishing line for spinning and casting reels is marketed on supply spools which normally contain considerably more line than actually required at any one time by a fisherman. The unloading of the spools, especially monofilament nylon spools, requires considerable care since the spools must be rotated during the dereeling at a sufficiently slow speed that the line does not become tangled. In practice, two people must work together, one controlling the reel and the other the supply spool in order to load the reel without fouling the line. Even when two people work together it frequently happens that only a small amount of the line on the supply spool can be used before the line becomes hopelessly tangled.

Spool holders have been devised for mounting on fishing rods so that one person can wind fresh line onto a reel. These devices have either been cumbersome or else unduly expensive and require assembly onto and removal from the fishing rod and, accordingly, are inconvenient to use. The need exists for an inexpensive yet convenient spool holder enabling a fisherman by himself to reel line from a supply spool onto a casting or spinning reel without taking undue care or time and without fouling the line.

SUMMARY OF THE INVENTION

In accordance with this invention, a holder is provided for a fishing line supply spool incorporating a suction cup so that the holder can be mounted where desired such as on a surface of a boat, a dock, or any other convenient place. The holder is designed for use with various presently commercially available types of supply spools. The holder includes a spindle and a pair of retaining plates slidably mounted on the spindle and receiving a supply spool therebetween. The parts assembled are held upon the spindle by the suction cup and a spiral spring coiled about the spindle and held under compression by a retaining clip. The spindle has substantially the same diameter as the bore of a popular type of supply spool so that there is a snug fit therebetween. This snug fit, coupled with the drag created by the spring placed under compression, has been found sufficient to prevent the supply spool from overrunning as the line is dereeled therefrom.

Most supply spools have either a ⅜-inch diameter bore or a ⅝-inch diameter bore. For this reason the spindle has a three-eighths inch diameter. To accommodate spools having a ½-inch diameter bore, the retaining plates each have hubs projecting from one face thereof, the outer diameters of which are five-eighths inch. The other faces of the retaining plates are substantially planar. Accordingly, the plates can be mounted upon the spindle with their hubs directed away from one another for use with supply spools having the smaller diameter bore. Conversely, when used with supply spools having the larger diameter bore, the retaining plates are mounted on the spindle with their hubs pointing toward each other. The hubs, accordingly, provide bearings for the spool.

Further to prevent fouling of the line, and especially to prevent the line from accidentally wrapping around the spindle, both of the retaining plates are provided with peripheral annular flanges extending immediately around the outer periphery of the spool end walls. Thus, regardless of the positions of the plates upon the spindle, a relatively broad guiding surface is provided assisting to retain the line between the spool end walls. By virtue of this construction no eyelet or other guide means is required. The flanges are circular and surround the circular spool end faces. In the event the bores in a spool become oversize through wear, the flanges will provide a supplemental bearing for the spool.

Other objects and advantages will become apparent from the following description and the drawing.

DESCRIPTION OF THE PREFERRED EMBODIMENT

Figure 1:
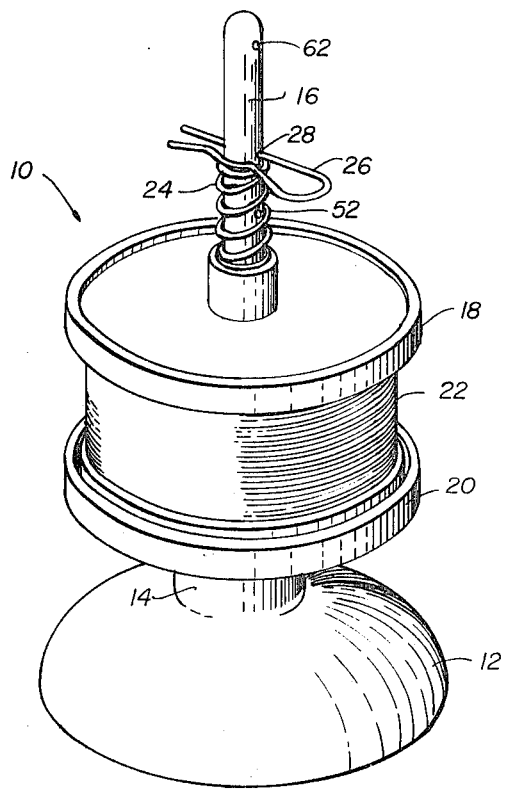
FIG. 1 is a perspective view of a spool holder in accordance with this invention with a supply spool mounted thereon.
Figure 2:
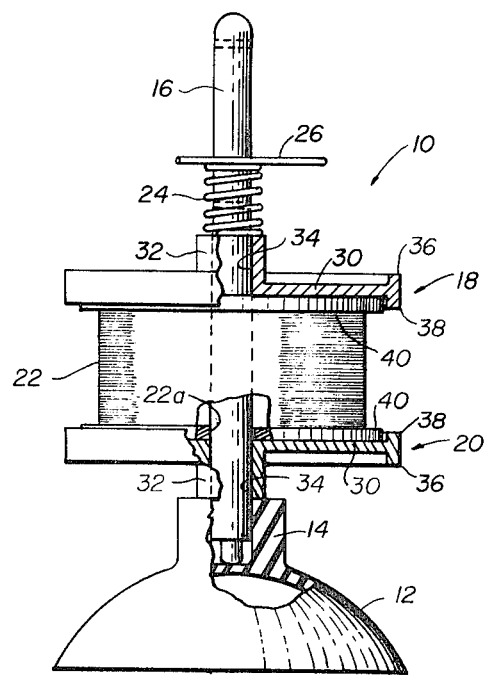
FIG. 2 is an elevational view, with parts in cross section, of the holder and spool of FIG. 1.

With reference to FIGS. 1 and 2, a fishing line spool holder in accordance with this invention is generally designated 10 and includes a suction cup 12 with an upstanding boss 14 bored to tightly receive an elongate, cylindrical spindle 16. Slidably received upon the spindle 16 are a pair of retaining plates, generally designated 18 and 20, which sandwich a fishing line supply spool 22 therebetween. The parts thus assembled on the spindle 16 are held in position upon the suction cup 12 by a spiral spring 24 coiled about the spindle 16. The spring 24 is of the type which resists compression and is held under compression and in engagement with the upper retaining plate 18 by a removable spring-retaining clip 26, one leg of which projects through an aperture 28 extending transversely through the spindle 16.

The diameter of the portion of the spindle 16 projecting above the suction cup 12 is uniform and is preferably three-eighths inch. The supply spool 22 illustrated in FIGS. 1 and 2 is of a popular, commercially available type having a ⅜-inch diameter bore, designated 22a. The plates 18 and 20 are, as illustrated, of identical construction. The plate 18 includes a centrally apertured circular disc 30, the faces of which shown in FIG. 2 are substantially planar. Projecting from the upper face of the disc 30 is a cylindrical hub 32 against which one end of the spring 24 is engaged. The apertures in the hub 32 and the disc 30 aligned and define a bore, designated 34, of substantially the same diameter as the spindle 16 and the bore of the supply spool 22. Peripheral, axially extending annular flanges 36 and 38 extend from both faces of the disc 30. The diameter of the radial extent of the disc portions 30 between the inner faces of the flanges 36 and 38 is slightly greater than the outer diameter of the end faces, designated 40, of the supply spool 22. The plate 20 is identically constructed, the parts thereof being given the same reference characters 30, 32, 34, 36 and 38.

In use, the suction cup 12 is pressed against any convenient, relatively smooth surface. It may be noted that because the parts are held assembled on the spindle 16 by the spring 24 and the retaining clip 26, the spindle 16 does not have to be projecting vertically upwardly as shown in the drawings. The end of line on the spool 22 is connected to a fishing reel (not shown) and dereeled by rotating the crank of the fishing reel. The close fit of the part of the spindle 16 and the pressure of the spring 24 result in a sufficient frictional drag on the spool 22 tending to resist its rotation that the line can quickly be dereeled without becoming fouled. Parts of supply spools are commonly made from cardboard or other material, and their bores may become out of round or enlarged through use. Since the circular flanges 36 and 38 surround the spool end faces 40, the flanges may, therefore, act as supplemental bearings and thus insure that the spool will rotate about the longitudinal axis of the spindle 16. The same benefits are obtained when the holder 10 is used with other popular sizes of supply spools, such as those described below.

Figure 3:
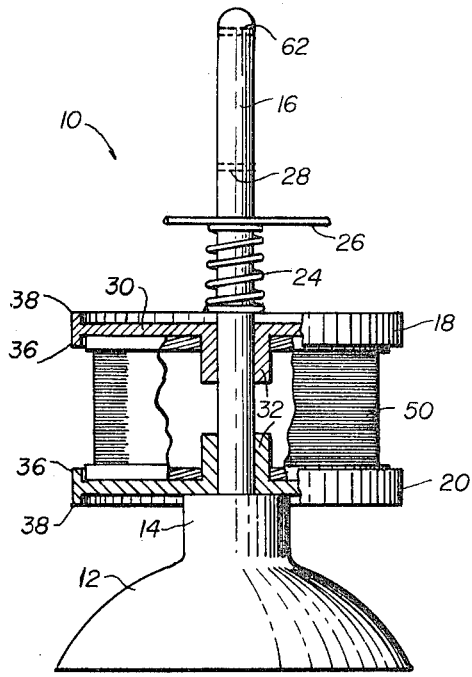
FIG. 3 is an elevational view, again with parts in cross section, showing the holder used with a different size supply spool.

FIG. 3 shows the same spool holder 10 described above but used with a supply spool 50 having a larger diameter bore. A conventional larger bore size is five-eighths inch. For this purpose the outer diameters of the hubs 32 are five-eighths inch. In FIG. 3, the positions of the plates 18 and 20 are upside down from that shown in FIG. 2. Accordingly, the hubs 32 project toward one another and thereby provide bearings for the supply spool 50. Because of the double flanges 36 and 38, fouling of the line about the spindle 16 is avoided whether the plates 18 and 29 are positioned as shown in FIG. 2 or as shown in FIG. 3. The stacked height of the plates 18 and 20 along with the supply spool 50 is shorter than illustrated in FIG. 2 due to the reversed orientation of the hubs 32. To compress the spring 24, the retaining clip 26 is passed through a transverse aperture 52 (see FIG. 1) in the spindle 16 which is longitudinally spaced closer to the suction cup 12 than the aforementioned aperture 28.

Figure 4:
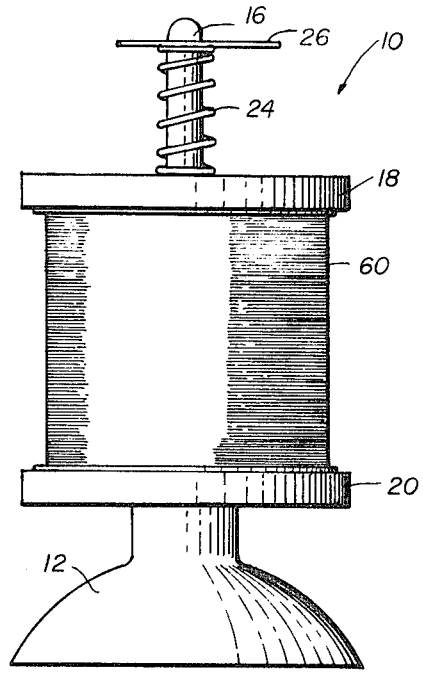
FIG. 4 is an elevational view of the holder used with still another size of supply spool.

FIG. 4 shows the same holder 10 holding a supply spool 60 which has a greater length than either the spool 22 or the spool 50. The particular supply spool 60 illustrated is of the type having a ⅝-inch bore and thus the hubs 32 are not seen in FIG. 4, the retaining plates 18 and 20 being mounted in the same relative positions as they are shown in FIG. 3. To accommodate the longer supply spool 60, still another transversely extending aperture, designated 62, (see FIGS. 1 and 2) is located near the top of the spindle 16. The single aperture 62 can be used in association with both the ⅜-inch bore spool and the ⅝-inch bore spool since, for both types of spools, the drag created by the spring 24 will be adequate but not excessive. To obtain a greater uniformity of drag still another aperture could, if desired, be located in the spindle 16.

From the foregoing it will be appreciated that a conveniently usable spool holder is provided with which one may use a variety of popular types of supply spools and dereel line from the spools with a minimum of time and effort. The plates 18 and 20 as well as the spindle 16 can be molded from a suitable plastic material. A cost savings results from the fact that the two plates 18 and 20 are identical so that one mold may be used for each. It should be apparent that the holder of this invention is rugged and useful for its purpose yet quite inexpensive.

Although the presently preferred embodiment of this invention has been described, it will be understood that various changes may be made within the scope of the appended claims.

Having thus described my invention, I claim:

1. A fishing line spool holder comprising a spindle adapted to slidably receive a fishing line supply spool, suction cup means supporting said spindle, a pair of retaining plates slidably mounted on said spindle and adapted to receive said spool therebetween, and bias means coacting between said spindle and one of said plates for retaining said plates and said spool on said spindle with the other of said plates engaged with said suction cup means.

2. The spool holder of claim 1 wherein each of said retaining plates comprises a flat disc with peripheral annular flanges extending from at least one of the faces thereof.

3. The spool holder of claim 1 wherein each of said retaining plates comprises a flat disc with a centrally located hub projecting from one face thereof and having a centrally located bore extending through said disc and said hub.

4. The spool holder of claim 1 wherein each of said retaining plates comprises a flat, circular disc with a centrally located cylindrical hub projecting from one face thereof and peripheral annular flanges extending from both faces thereof and having a centrally located bore extending through said disc and said hub.

5. The spool holder of claim 4 wherein said retaining plates are identically constructed from molded plastic material.

6. The spool holder of claim 1 wherein said bias means comprises a spiral spring coiled about said spindle and said spool holder further includes removable means for preventing said spring from sliding off said spindle and holding said spring under compression against said one of said retaining plates.

7. The spool holder of claim 6 wherein said removable means comprises a retaining clip having a leg extending through an aperture in said spindle.

8. The spool holder of claim 7 wherein said spindle has a plurality of longitudinally spaced apertures to accommodate supply spools having various different lengths.

9. The spool holder of claim 1 wherein each of said retaining plates comprises a flat, circular disc with a centrally located cylindrical hub projecting from one face thereof and having a bore extending centrally through said disc and said hub, said spindle having a diameter substantially the same as the bore diameters of commercially available fishing line supply spools and wherein said hubs have outer diameters substantially the same as the bores of others of commercially available fishing line supply spools, the bores of said retaining plates having diameters the same as the diameters of said spindle whereupon said retaining plates may be positioned on said spindle with their said hubs projecting away from one another for receiving said first-mentioned supply spools between the other faces thereof or, alternatively, with their hubs projecting toward one another to provide bearings for rotatably receiving said others of said supply spools.

10. The apparatus of claim 9 wherein the diameter of the bore of each of said plates is substantially three-eighths inch and the outer diameter of each of said hubs is substantially five-eighths inch.

* * * * *